US008419250B2

(12) United States Patent
Ohsawa

(10) Patent No.: US 8,419,250 B2
(45) Date of Patent: Apr. 16, 2013

(54) VEHICLE HEADLAMP

(75) Inventor: Takashi Ohsawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 305 days.

(21) Appl. No.: 12/740,885

(22) PCT Filed: Nov. 13, 2008

(86) PCT No.: PCT/JP2008/003313

§ 371 (c)(1), (2), (4) Date: Jul. 22, 2010

(87) PCT Pub. No.: WO2009/090700

PCT Pub. Date: Jul. 23, 2009

(65) Prior Publication Data

US 2010/0296308 A1 Nov. 25, 2010

(30) Foreign Application Priority Data

Jan. 17, 2008 (JP) ................................ 2008-008202

(51) Int. Cl.
*B60Q 1/00* (2006.01)

(52) U.S. Cl.
USPC ............................ 362/547; 362/345; 362/373

(58) Field of Classification Search .................. 362/547, 362/345, 373, 294, 544, 293
See application file for complete search history.

(56) References Cited

U.S. PATENT DOCUMENTS

| | | | |
|---|---|---|---|
| 2004/0202007 A1* | 10/2004 | Yagi et al. | 362/545 |
| 2009/0126905 A1* | 5/2009 | Dinh | 165/80.3 |
| 2009/0213613 A1 | 8/2009 | Mitic et al. | |

FOREIGN PATENT DOCUMENTS

| | | | |
|---|---|---|---|
| DE | 102004017454 | A1 | 1/2005 |
| DE | 102004046764 | A1 | 4/2006 |
| DE | 102006010977 | A1 | 12/2007 |
| JP | 2004-127782 | A | 4/2004 |
| JP | 2004-311224 | A | 11/2004 |
| JP | 2006-114275 | A | 4/2006 |
| JP | 2006-164967 | A | 6/2006 |
| JP | 2006-286395 | A | 10/2006 |
| JP | 2007-273369 | A | 10/2007 |
| WO | WO 2006/034755 | A1 | 4/2006 |
| WO | 2006/052022 | A1 | 5/2006 |

* cited by examiner

*Primary Examiner* — Anne Hines
(74) *Attorney, Agent, or Firm* — Birch, Stewart, Kolasch & Birch, LLP

(57) ABSTRACT

A vehicle headlamp includes a light source section 1 for emitting light accompanied by heat; a heat pipe 3 thermally connected with the light source section for absorbing and transferring the heat generated by the light source section; a heat radiating member 4 furnished in a position away from the optical axis of the light generated by the light source section and closer to the front than the light source section to be thermally connected to the heat pipe, for radiating the heat transmitted by the heat pipe to produce a convection current; and a headlamp case 6 housing light source section, the heat pipe, and the heat radiating member such that a part of the front lens for transmitting the light from the light source section is formed above the heat radiating material.

10 Claims, 6 Drawing Sheets

(a)

(b)

(a)

(b)

(a)

(b)

VEHICLE HEADLAMP

TECHNICAL FIELD

The present invention relates to a vehicle headlamp used for a headlight of a vehicle, and more particularly to a technology for dealing with the heat generated by a light source thereof.

BACKGROUND ART

As a light source used for a vehicle headlamp, a conventional incandescent lamp is replaced by a discharge lamp (HID lamp), and further superseded by a light emitting diode (LED) in recent years. However, all the light sources should be cooled since they generate heat as there are somewhat differences in the amount of generated heat. On the other hand, snow often deposits on the front lens of the vehicle headlamp during snowfall particularly in cold districts, and thus it is required to heat up the front lens so as to melt the snow thereon.

As one technology for cooling a vehicle headlamp, a technology for radiating the heat by extending a heat radiating section of a vehicle headlamp forwardly from the light source thereof is known. For example, Patent Document 1 discloses a projector-type vehicle headlight unit where optical positional relations between components can be adjusted with a high degree of accuracy, the number of components can also be reduced, and further an excellent effect of heat dissipation can be achieved. The projector-type vehicle headlight unit has a structure where a member for fixing an LED and radiating the heat thereof and a member for securing a convex lens are provided integral with each other. According to the arrangement of the headlight unit, the convex lens, the light source, and the heat radiating member thereof are provided integral with each other. Thus, adjustment of the optical axis of the headlamp is facilitated, and a heat sink (heat radiating member) extending to the convex lens section can transfer heat to the vicinity of the convex lens to dissipate the heat therefrom.

Further, a technology for radiating the heat generated by a light source (LED) with a heat pipe is known as another technology for cooling a vehicle headlamp. For example, Patent Document 2 discloses a vehicle lamp where a measure against the heat from an LED is compatible with the enhancement of degree of freedom on the position of the LED to be disposed. The vehicle lamp disclosed by Patent Document 2 has a structure where a general heat pipe is disposed with a heat adsorbing section connected to the LED being arranged below and with a heat radiating section being arranged above, such that an effective performance based on the mechanism of heat conduction is obtained.

Furthermore, Patent Document 3 discloses a vehicle lamp where the technology disclosed in Patent Document 2 is improved by looping a rod-shaped heat pipe. In the vehicle lamp disclosed in Patent Document 3, the lamp is arranged such that the flow of liquid and vapor present within the heat pipe is not interrupted even when a vehicle having the headlamp mounted thereon inclines.

Meanwhile, Patent Document 4 discloses a technology for restricting the temperature rise of semiconductor light emission elements in a vehicle headlight arranged such that light distribution patterns of two or more types are formed by a plurality of lamp units using a semiconductor light emission element as a light source. In the technology disclosed in Patent Document 4, the heat generated by the LEDs is transferred to a front lens disposed lower than the LEDs by using a heat pipe.

In addition, Patent Document 5 discloses a vehicle lamp where the temperature of LEDs can be more positively reduced. In the vehicle lamp, the heat generated by the LEDs is transferred to the upper portion of the case of a headlamp disposed higher than the LEDs and to a front lens disposed lower than the LEDs by using a heat pipe.

Lastly, Patent Document 6 discloses a vehicle lamp that can promptly remove the fogging of a front lens and ice and snow deposited thereon as one technology for warming the front lens of a vehicle headlamp. In the vehicle lamp, a semiconductor light emission element is used as a light source, one side of a heat-conduction board is connected with the vicinity of a heat sink where the semiconductor light emission element is disposed, and the other side of the heat-conduction board is in contact with a portion of the front lens which does not get involved in the formation of a light distribution. In this way, the occurrence of fogging and the deposition of snow and ice can be prevented and further maintenance can be simplified by using the heat generated during lighting of the semiconductor light emission element.

Patent Document 1: JP-A-2006-114275
Patent Document 2: JP-A-2004-127782
Patent Document 3: JP-A-2006-164967
Patent Document 4: JP-A-2004-311224
Patent Document 5: JP-A-2006-286395
Patent Document 6: JP-A-2007-273369

However, the above-described conventional technologies each have the following problems. To be more exact, in the technology disclosed by Patent Document 1, the heat is transferred to the vicinity of the convex lens by the heat sink (heat radiating member) extending to the convex lens section; however, the heat conduction performance of the heat sink is mainly dependent on the heat or thermal conductivity of the metal material forming the heat sink, the preparation is necessary, of a large-sized member in order to secure a sufficient thermal conduction quantity, a cost increase cannot be avoided, and moreover, the use of a large-sized member is undesirable from the viewpoint of space. Furthermore, the technology does not consider the heat radiation at portions located forward of the convex lens.

Further, in the technology disclosed in Patent Document 2, the LED and a case are connected to each other with a rigid heat pipe, and thus the optical axis cannot be adjusted. Moreover, in the technology disclosed by Patent Document 3, the heat pipe is fixed movably to the LED (heat receiving section), and thus the optical axis can be adjusted though the heat conduction performance thereof at the fixed portion is poor. However, in the technologies disclosed by Patent Document 2 and Patent Document 3 discussed above, the heat generated by the LED is discharged outwardly from the case of the headlamp, and thus it is impossible to warm the front lens of the headlamp. Incidentally, in the technology disclosed by Patent Document 3, the loop-shaped heat pipe is arranged such that the heat conduction performance thereof can be obtained even when the liquid and the vapor present internally therein circulate from whichever side of the loop, and thus it is impossible to transmit the heat in one direction toward a specific portion by the circulation of the liquid and the vapor located therein.

Moreover, in the technology disclosed by Patent Document 4, the heat pipe is fixed to the heat conduction member of the LEDs, and thus the heat conduction performance to the heat pipe is excellent. However, the arrangement for disposing components is complicated. Besides, in the technology disclosed by Patent Document 5, the heat pipe is in contact with the heat conduction member of the LEDs; however, the heat pipe is not secured to the member. Thus, the system has to admit that the performance for conducting the heat to the heat pipe is deteriorated. According to each of the technologies disclosed by Patent Document 4 and Patent Document 5 discussed above, an arrangement for radiating the heat downwardly from the heat adsorbing section with a heat pipe is employed, and thus the heat conduction mechanism of the heat pipe is not efficiently used. Therefore, the heat pipe does not fully produce an effect in its heat conduction performance, the heat generated by the LED is not sufficiently adsorbed, resulting in insufficient warming of the front lens of necessity.

Furthermore, according to the technology disclosed by Patent Document 6, the heat-conduction board for connecting the vicinity of the heat sink where the semiconductor light emission element is disposed with the portion of the front lens which does not get involved in forming the light distribution is formed of a metallic plate such as copper or aluminum plate. Thus, just as with Patent Document 1 discussed above, the heat conduction performance thereof depends mainly on the heat conductivity of the metal material. Therefore, there is a problem that it is necessary to prepare a large-sized member in order to secure a sufficient heat conduction quantity, an increase in cost is unavoidable, and moreover, the use of a large-sized member is undesirable from the viewpoint of space The present invention has been made to solve the above-mentioned problems, and an object of the present invention is to provide a vehicle headlamp capable of cooling a light source and also efficiently warming a front lens.

DISCLOSURE OF THE INVENTION

In order to solve the above-described problems, the vehicle headlamp according to the present invention includes a light source section for emitting light accompanied by heat; a heat pipe thermally connected with the light source section, for absorbing and transferring the heat generated by the light source section; a heat radiating member provided at a forward position of the light source section and deviated from the optical axis of the light emitted by the light source section to be thermally connected to the heat pipe, for radiating the heat transferred by the heat pipe to produce a convection current; and a headlamp case for housing the light source section, the heat pipe, and the heat radiating member, and having provided on the upper side of the heat radiating member a portion of a front lens for passing the light from the light source section.

According to the vehicle headlamp provided by the present invention, since it is arranged that a convection current is generated by conveying the heat generated by the light source section to the heat radiating member by way of the heat pipe to radiate the heat therefrom, the light source section can be cooled. Also, since the front lens can be efficiently warmed by the convection current, for example, the snow deposited on the front lens can be melted.

BEST MODE FOR CARRYING OUT THE INVENTION

Embodiments of the present invention will now be described with reference to the accompanying drawings in order to explain the present invention in more detail.

First Embodiment

A vehicle headlamp in accordance with the first embodiment of the present invention is arranged such that heat is conveyed with a rod-shaped heat pipe formed in the shape of a rod.

Figure 1:
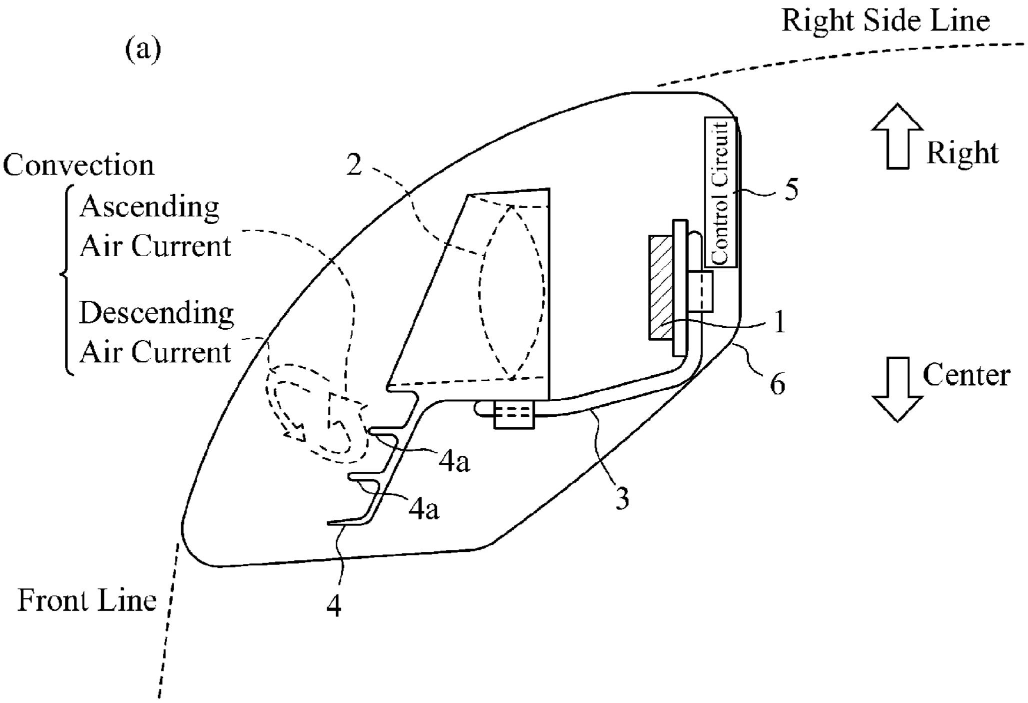
FIG. 1 is a view showing a structure of a vehicle headlamp in accordance with the first embodiment of the present invention.
Figure 1:
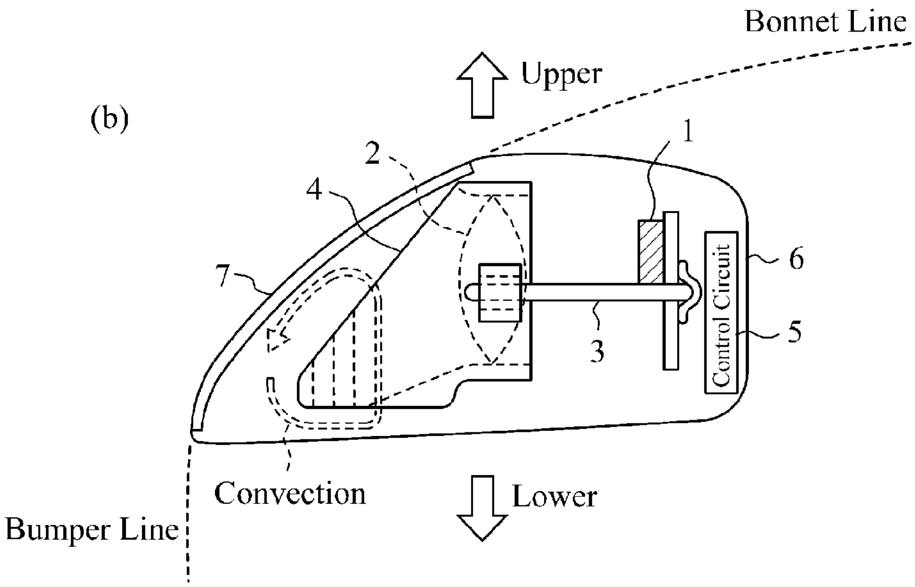

FIG. 1 is a view showing a structure of a vehicle headlamp in accordance with the first embodiment of the present invention, FIG. 1(*a*) is a top plan view of a right vehicle headlamp, and FIG. 1(*b*) is a side view thereof.

The vehicle headlamp is composed of a light source section 1, a convex lens 2, a heat pipe 3, a heat radiating member 4, a control circuit 5, and a headlamp case 6 for housing those components. As shown in FIG. 1(*b*), a front lens 7 is formed at a portion of the front side of the headlamp case 6, to be more specific, at a portion thereof located on the upper side of the heat radiating member 4 in a predetermined area around the optical axis of the light emitted by the light source section 1.

The light source section 1 is composed of a semiconductor light emitting element such as an LED, and emits light in a plane shape in response to a control signal from the control circuit 5. The light emitted by the light source section 1 is radiated toward the convex lens 2.

In this context, the following light sources can be generally employed for the planar light source:

(1) An incandescent lamp such as a halogen lamp;

(2) A discharge lamp such as an HID lamp; and (3) A semiconductor light source such as an LED.

The convex lens 2 concentrates the light emitted by the light source section 1 and projects the light onto the road surface forward of a vehicle by way of the front lens 7. In this way, the real image of the planar light source is formed on the forward road surface to function as a vehicle headlamp of a projector type. The convex lens 2 is exposedly disposed between the light source section 1 and the front lens 7 with a space to the front lens 7.

The heat pipe 3 comes in contact with each of the light source section 1 and the heat radiating member 4 to be thermally connected therewith. The heat pipe 3 absorbs the heat emitted by the light source section 1 and transfers the heat to the heat radiating member 4. The heat pipe 3 will be described in detail later.

The heat radiating member (heat sink) 4 is arranged such that a portion thereof is disposed at a position deviated from the optical axis of the light emitted by the light source section 1 and closer to the front than the light source section 1, to be more specific, downward of the center of the front lens 7, and the heat radiating section is provided at a position shifted right or left from the center of the vehicle headlamp. The heat radiating member 4 releases the heat transferred from the light source section 1 by way of the heat pipe 3 by transferring the heat to a gas (referred to as "internal gas" hereinafter) inside the headlamp case 6. Accordingly, the heat emitted by the light source section 1 is transferred to the lower portion of the front lens 7 by the heat pipe 3 and the heat radiating member 4.

The heat transferred to the heat radiating member 4 produces an ascending gas current on the front side of the interior of the headlamp case 6, and thereby convection is generated such that the ascending current hits the front lens 7 to be cooled and thereby produce a descending gas current. When the front side of the vehicle headlamp is warmed or heated due to the circulating gas, the front lens 7 is warmed, thereby melting the snow deposited on the front lens 7. It is noted that the heat radiating member 4 is provided at a position shifted right or left from the center of the vehicle headlamp, and thus the place where the internal gas is warmed occupies positions shifted right or left from the center of the vehicle headlamp. Thus, the convection in the internal gas can be effectively produced.

To be more exact, in the vicinity of the front lens 7, there is a space larger than that in the vicinity of the light source section 1 furnished at the back of the vehicle headlamp, and thus a convection current is easily generated by a temperature difference in the internal gas. Further, when the gas existing in the vicinity of the front lens 7 is warmed biased toward either of right and left, the temperature difference is increased between the higher temperature portion and the lower temperature portion in a space near to the front lens 7 in the vehicle headlamp to thereby produce an effective convection current, so that the internal gas can be circulated. The front lens 7 is warmed over the wide area by the circulation of the warmed gas, and thus the effect of preventing snow from adhering to the front lens 7 is enhanced. At the same time, the circulation of the gas enhances the heat radiation effect of the heat pipe 3 and improves the heat adsorption effect of a heat adsorbing section, and thus the light source section 1 can be maintained at a low temperature.

The heat radiating member 4 has a vertically extending fin 4*a*. Providing the heat radiating member with the fin 4*a* increases the contact area between the heat radiating member and the internal gas, and thus the conveyance of the heat to the internal gas can be carried out more effectively. It is noted that since the fin 4*a* prepared on the heat radiating member 4 can increase resistance to the circulation of the internal gas, it is preferable for the fin 4*a* of the heat radiating member 4 to be formed in a shape having a groove or a wall extending in a circulating direction of the internal gas (e.g., in a vertical direction) so as not to greatly increase the resistance to the circulation thereof by restraining the ascending gas current from flowing.

The control circuit 5 performs control for feeding proper excitation energy to the light source section 1 to cause the section to light. The control circuit 5 is arranged integral with the headlamp case 6. In such a way, routing the wiring on the vehicle side becomes unnecessary, space efficiency on the vehicle side can be improved, and also the number of components can be reduced. It is noted that the control circuit 5 may be arranged to add thereto functions of performing a control for reducing electric power to be supplied at the time of overheating of the light source section 1, a control for reducing electric power to be supplied while the vehicle is stopped, and so on.

Next, the details of the heat pipe 3 will be described. The heat pipe 3 employed in the vehicle headlamp in accordance with the first embodiment is referred to as a "rod-type heat pipe," and is disposed such that the heat pipe is substantially horizontally supported, or such that a heat radiating section thereof (the section coming in contact with the heat radiating member 4) occupies a position higher than that of the heat adsorbing section (the section in contact with the maximum heating portion of the light source section 1).

Figure 2:
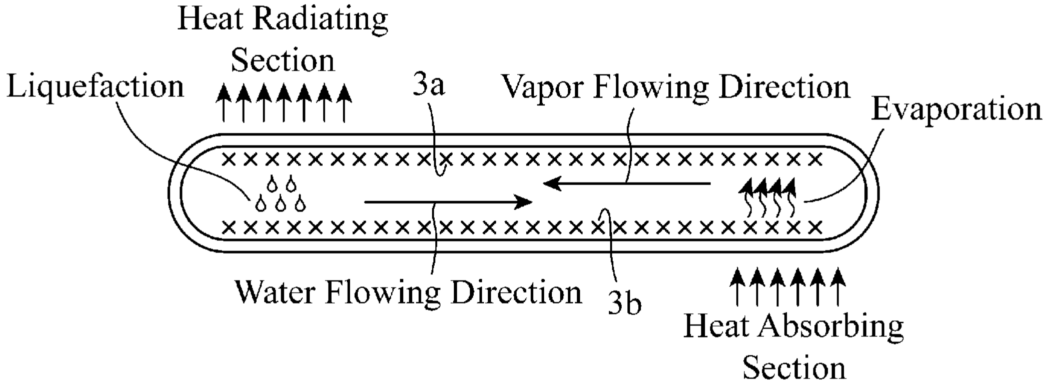
FIG. 2 is a sectional view showing a rod-shaped heat pipe used in the vehicle headlamp in accordance with the first embodiment of the present invention.

The heat pipe 3 uses a tube (pipe) made of copper or the like having a diameter of about 5 to 10 mm. FIG. 2 is a view showing the cross section of a rod-shaped heat pipe. The heat pipe has a capillary tube (mesh) 3*a* installed interiorly thereof, and has enclosed therein cooling liquid 3*b* such as water (liquid) (referred to as "water" hereinafter). Further, the heat pipe 3 is sealed with the interior thereof depressurized, e.g., substantially evacuated or vacuumed such that the enclosed water 3*b* is evaporated (boiled) at a temperature to which the heat pipe can respond.

It is noted that though the strength of the heat pipe 3 is required so as not to be destroyed by the internal pressure to be generated at the maximum temperature including a possible temperature under abnormal conditions, it can be configured that the maximum temperature to which the heat pipe can respond is lowered such that the electric power input to the light source section 1 is controlled by detecting the temperature of the heat pipe 3 to thus reduce the generated heat.

Next, the heat transferring operation by the rod-shaped heat pipe 3 will be described. In the interior of the heat pipe 3, the water heated by the heat given to the heat absorbing section (the heat generated by the light source section 1) is evaporated. The vapor increased in pressure by the evaporation flows toward the heat radiating section on the side of the front lens 7 of the heat pipe 3 having a low pressure, namely, having a low temperature, and then the heat thereof is released in the heat radiating section to be cooled and liquefied. The liquefied water returns to the heat absorbing section by flowing down due to gravitation, or by travelling through the capillary tubes due to surface tension. Thereafter, the water 3*b* is repeatedly evaporated and liquefied to be naturally circulated.

In this connection, when the heat absorbing section is disposed above and the heat radiating section is disposed below as shown in the technologies disclosed by Patent Document 4 and Patent Document 5 discussed above, most of the liquid present in the interior of the pipe is left or stayed at the lower portion thereof, the liquid raised to the heat absorbing section by travelling through the capillary tube located on the inner wall of the pipe is evaporated, and the vapor thus produced is come down and is liquefied in the vicinity of the liquid surface in the lower portion thereof. Therefore, the cycle of evaporation and liquefaction can be repeated only in an extremely narrow area between the liquid surface and the heat absorbing section. General liquids have a thermal conductivity smaller than that of a metallic member. Thus, even when the liquid surface of the liquid left in the lower portion thereof is warmed by the vapor, the quantity of heat transferred to the lower portion of the liquid is small. Further, even when the temperature of the liquid surface of the liquid (the upper layer thereof) is raised, the liquid reducing its specific gravity, that is, reduced in density because of such a temperature increase, is left in the upper layer, and therefore no convection is produced in the liquid. Thus, no conveyance of heat by the movement of the liquid also occurs. For this reason, in the arrangement where the heat is absorbed in the upper portion of the pipe and the heat is released in the lower portion thereof, no heat transfer by the cycle of evaporation and liquefaction occurs. The heat transfer performance of the system is substantially equal to that given by the heat transfer characteristic of the metallic member forming the heat pipe, and the heat pipe does not fully exhibit an effect in its heat transfer performance.

As described above, according to the vehicle headlamp of the first embodiment of the present invention, the light source section 1 can be cooled (heat can be removed therefrom) by absorbing the heat generated by the light source section 1 with the heat pipe 3, also a convection current can be generated in the internal gas of the vehicle headlamp by conveying the absorbed heat to the heat radiating member 4 with the heat pipe 3 to warm the member, and the front side of the vehicle headlamp can be warmed by the gas circulated by the convection, thus melting the snow deposited on the front lens 7.

Further, the heat radiating member 4 is arranged such that a portion thereof is disposed at a position deviated from the optical axis of the light emitted by the light source section 1, to be more specific, at a downward position of the center of the front lens 7, and is disposed at a position shifted right or left from the center of the vehicle headlamp. In this manner, the place where the internal gas is warmed occupies positions shifted right or left from the center of the vehicle headlamp, and thus the convection current can be efficiently produced in the internal gas.

Moreover, the convex lens 2 is exposedly disposed with a space provided with respect to the front lens 7 between the light source section 1 and the front lens 7, and thus, when the internal gas in the vicinity of the convex lens 2 is warmed, an effective convection current can be generated in the space between the convex lens and the front lens 7. Furthermore, there are the following advantages in the vehicle headlamp: a structure for radiating the heat can be provided in a comparatively short distance between the light source section 1 and the convex lens 2; a luminescence unit having a heat radiating system including the light source section 1, the convex lens 2, and the heat pipe 3 can be compactly built; and further the small luminescence unit is easy to handle when the irradiation direction of the vehicle headlamp is adjusted. In passing, the portion of the convex lens 2 can be viewed from the external of the vehicle, and is an important place in design for a vehicle headlamp. For this reason, an unrefined fin 4*a* for the heat radiating member 4 should be reluctantly furnished; however, when a ring-shaped heat radiating member 4 with mirror gloss enclosing the convex lens 2, for instance, is employed, deterioration in design of the vehicle headlamp can be prevented.

In addition, a simple rod-shaped heat pipe is employed for the heat pipe 3, and thus a general-purpose and inexpensive heat pipe is available therefor.

Further, the light generated by a light source using a semiconductor light emitting element such as a white light LED generating visible light with a phosphor contains a few infrared components, and thus the front lens 7 cannot be warmed by the irradiation light, unlike an incandescent lamp employing a tungsten filament or a halogen lamp. Therefore, the arrangement where the front lens 7 is warmed by taking advantage of the heat generated by the light source section 1 as in the vehicle headlamp of the aforementioned first embodiment is more effective than that of a vehicle headlamp adopting other light sources.

It should be appreciated that the arrangement for cooling the light source section 1 of the vehicle headlamp and warming the front lens 7 of the aforementioned first embodiment is also applicable to vehicle headlamps other than that employing a planar light source for the light source section 1, and even a vehicle headlamp with a point light source using an LED, a halogen lamp, a discharge lamp, or the like can carry out cooling of the light source section 1 and warming of the front lens 7 as the above.

Second Embodiment

A vehicle headlamp in accordance with the second embodiment of the present invention is arranged such that heat is transferred by using an annular heat pipe formed in the shape of a loop.

Figure 3:
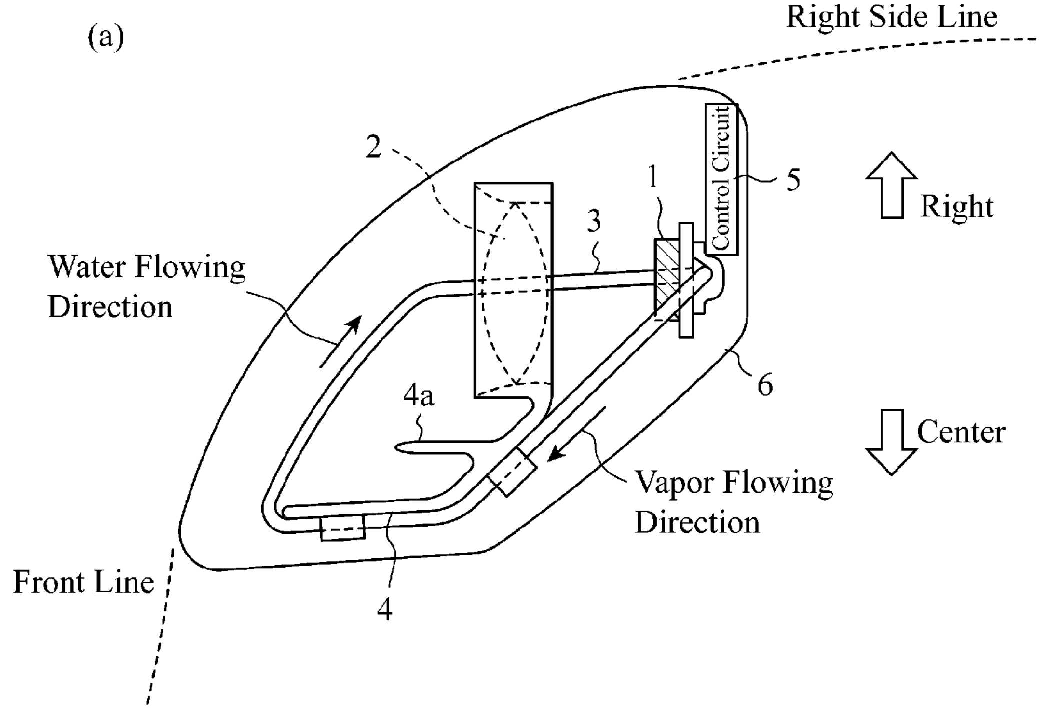
FIG. 3 is a view showing a structure of a vehicle headlamp in accordance with the second embodiment of the present invention.
Figure 3:
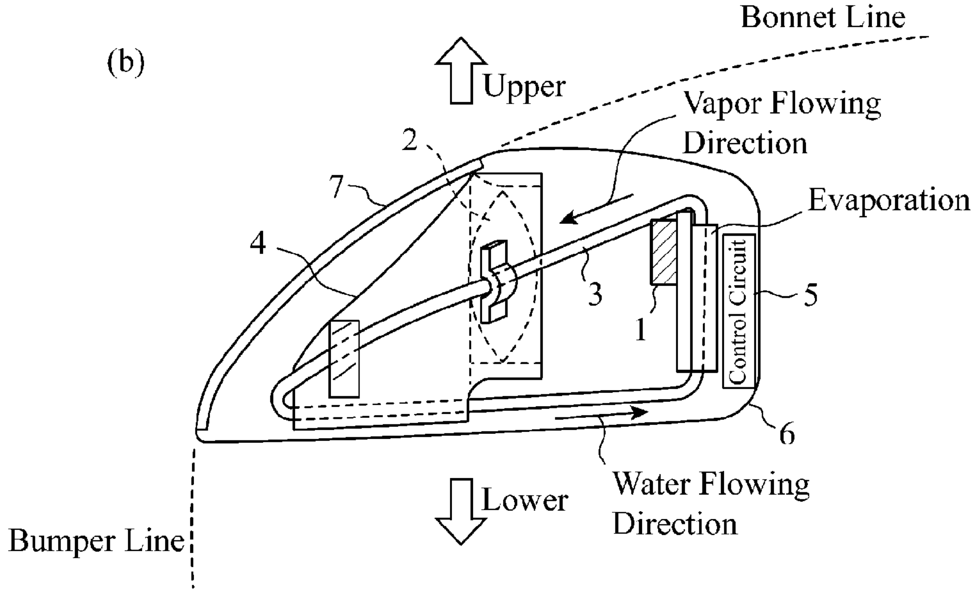

FIG. 3 is a view showing a structure of a vehicle headlamp of the second embodiment of the present invention, FIG. 3(*a*) is a top plan view of a right vehicle headlamp, and FIG. 3(*b*) is a side view thereof. The vehicle headlamp of the second embodiment is similar to that of the first embodiment except for the structure, installation, and function of the heat pipe 3. Hereinbelow, the constituent elements same as or corresponding to those of the vehicle headlamp of the first embodiment are designated by the same reference numerals as those used in the first embodiment, and explanations of the elements will be omitted. Explanations will be given with particular emphasis on the heat pipe 3.

The heat pipe 3 employed in the vehicle headlamp of the second embodiment is referred to as an "annular heat pipe." The heat absorbing section of the heat pipe 3 comes in contact with the maximum heating portion of the light source section 1 to thereby be thermally connected thereto, and piping forming the heat pipe is installed such that the heat absorbing section vertically has a difference of altitude. Further, the piping constituting the heat pipe 3 is routed in the shape of a loop where the heat pipe descends from the upper portion of the heat absorbing section toward the front of the vehicle headlamp, comes in contact with the heat radiating member 4 in the heat radiating section formed forward of the vehicle headlamp to be thermally connected therewith, is further turned from the front of the vehicle headlamp, and passed beneath the convex lens 2 and the light source section 1, to thus be connected to the heat absorbing section.

Figure 4:
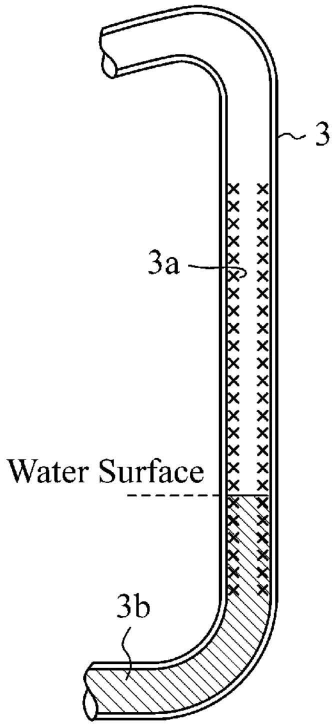
FIG. 4 is a view partially showing the cross section of a heat adsorbing section formed in a vertical portion of an annular heat pipe used in the vehicle headlamp in accordance with the second embodiment of the present invention.

A tube (pipe) made of copper or the like having a diameter of the order of 5 to 10 mm is employed for the heat pipe 3 as with the vehicle headlamp in accordance with the first embodiment. FIG. 4 is a view partially showing the cross section of the heat absorbing section formed in a perpendicular portion of the annular heat pipe 3. The heat pipe has a capillary tube (mesh) 3*a* overlaid inside, and has water (liquid) 3*b* poured therein to a level at which the water surface (liquid surface) within the pipe on the forward side of the vehicle headlamp and the water surface (liquid surface) within the pipe on the backward side thereof are divided at the top portion of the pipe. Further, the heat pipe 3 is sealed with the interior thereof depressurized, e.g., substantially vacuumed such that the enclosed water 3*b* is evaporated (boiled) at a temperature to which the heat pipe can respond.

In this connection, the strength is required of the heat pipe 3 with which the heat pipe 3 is not destroyed by the internal pressure generated at the maximum temperature including a possible temperature under abnormal conditions; however it can be arranged that the maximum temperature to which the heat pipe can respond is lowered in such a manner that the electric power supplied to the light source section 1 is controlled to reduce the generated heat by detecting the temperature of the heat pipe 3.

Next, the heat transferring operation by the annular heat pipe 3 will be described. In the heat pipe 3, the water heated by the heat given to the heat absorbing section (the heat generated by the light source section 1) is evaporated. The vapor increased in pressure by the evaporation flows descendingly from the upper portion of the pipe toward the heat radiating section located on the side of the front lens 7 and having a low pressure, in other words, having a low temperature, releases heat to the upper portion of the heat radiating section, and is cooled and thereby liquefied (becomes high-temperature water).

Then, the liquefied high-temperature water is caused to flow to the lower portion of the heat radiating section, radiates heat also at the lower portion of the heat radiating section to become cooled warm water (low-temperature warm water). The low-temperature warm water turns from the front of the vehicle headlamp and flows beneath the convex lens 2 and the light source section 1 to return to the heat absorbing section. Thereafter, the water 3*b* is repeatedly evaporated and liquefied to be naturally circulated.

As described above, according to the vehicle headlamp of the second embodiment of the present invention, there are provided the following effects. When a rod-shaped heat pipe is employed as in the vehicle headlamp in accordance with the first embodiment discussed above, in order to circulate water inside the heat pipe, the heat radiating section cannot be disposed lower than the position at which the liquid can be sucked up to the heat absorbing section by surface tension, and in a heat pipe having an arrangement not employing a capillary tube, the heat radiating section should be disposed horizontal or higher with respect to the heat absorbing section.

In other words, the rod-shaped heat pipe can only convey heat to a position higher than that of the heat absorbing section, and thus in a vehicle headlamp having the light source section 1 generating heat being positioned around the center in the vertical direction, it is not convenient to warm the portion lower than the center. Therefore, even if heat is conveyed to a middle layer portion thereof in front of the vehicle headlamp by way of the rod-shaped heat pipe, the flow path of the ascending gas current to be produced therein that flows from the middle layer to the upper layer is short, and a chimney effect thus obtained is small. As a result, a convection current cannot be sufficiently generated.

In contrast, the annular heat pipe 3 employed in the vehicle headlamp in accordance with the second embodiment enables heat to be transferred also to a portion located lower than the heat absorbing section by virtue of the liquid flowing therein. Thus, an ascending gas current flowing from the lower layer to the upper layer in the narrow space of the vehicle headlamp limited in the vertical direction can be produced, the chimney effect is increased in a long flow path, and thereby an effective convection current can be generated.

Also, a general rod-shaped heat pipe has a special capillary structure internally provided, and has a complicated structure, which leads to be inevitably expensive. By contrast, in the case of the annular heat pipe 3, even if the internal capillary is laid only in a local portion therein, or is quite eliminated therefrom, the effect of carrying heat is sufficiently obtained. Particularly in an arrangement where no capillary is used therein, since the heat pipe is composed of only a pipe material and water as a main material, an inexpensive heat radiating mechanism can be achieved.

Besides, the cooling liquid within the annular heat pipe 3 is naturally circulated by a cycle of evaporation and liquefaction. Thus, it is not required to compulsorily cause the cooling liquid to circulate, and a highly effective heat transfer can be achieved at low cost.

It should be appreciated that the pipe used for the annular heat pipe 3 can have a flat surface such that a capillary 3*a* is removed from an inner wall thereof. Specifically, the cooling liquid can be supplied to the heat absorbing section by naturally circulating the cooling liquid, without using the penetration effect owing to the capillary in order to supply the cooling liquid thereto, and thus it is not needed to prepare the inner wall of the heat pipe 3 with a capillary structure. As a result, an inexpensive general-purpose tube (pipe) having a flat or smooth inner wall surface is available therefor to thereby reduce the cost of the heat pipe 3.

Third Embodiment

A vehicle headlamp in accordance with the third embodiment of the present invention employs a concave mirror 8 in place of the convex lens 2 employed in the vehicle headlamp in accordance with the first embodiment.

Figure 5:
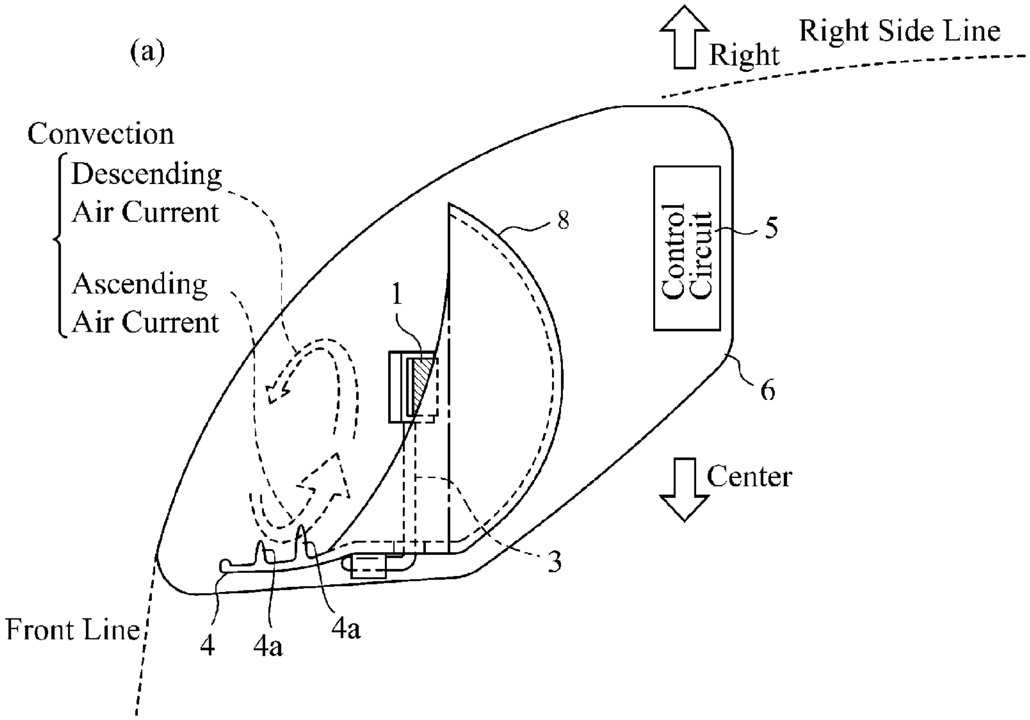
FIG. 5 is a view showing a structure of a vehicle headlamp in accordance with the third embodiment of the present invention.
Figure 5:
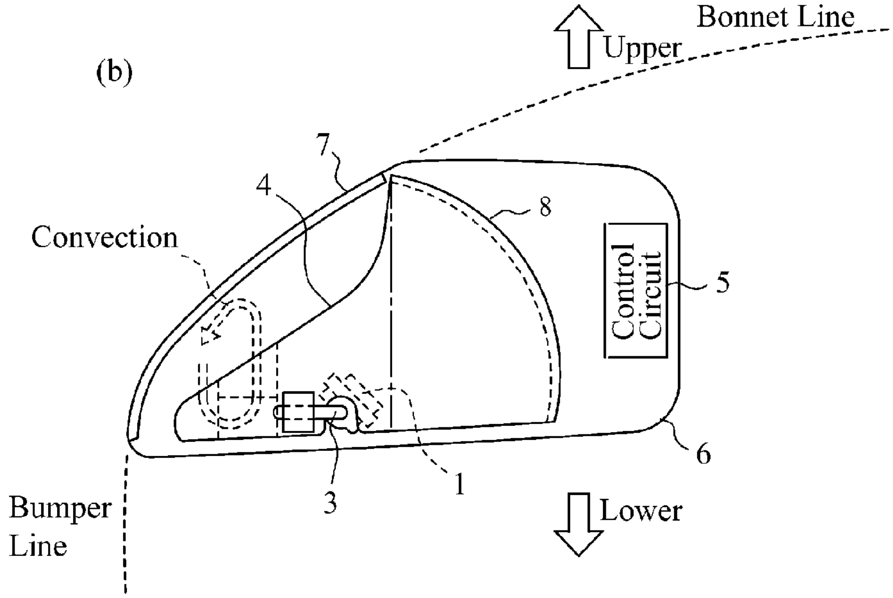

FIG. 5 is a view showing a structure of a vehicle headlamp using a rod-shaped heat pipe in accordance with the third embodiment of the present invention, FIG. 5(*a*) is a top plan view of a right vehicle headlamp, and FIG. 5(*b*) is a side view thereof. The vehicle headlamp is composed of a light source section 1, a concave mirror 8, a heat pipe 3, a heat radiating member 4, a control circuit 5, and a headlamp case 6 for housing those components. As shown in FIG. 5(*b*), a front lens 7 is provided in a portion of the front side of the headlamp case 6, to be more specific, in a portion thereof located in a predetermined area around the optical axis of the light emitted by the light source section 1 and reflected by the concave mirror 8 on the upper side of the heat radiating member 4. Hereinlater, explanations will be given with particular emphasis on the portion different from that of the first embodiment.

The light source section 1 is disposed forward of the concave mirror 8 and downward of the front lens 7. The concave mirror 8 reflects the light from the light-emitting surface of the light source section 1, and projects the light onto the surface of the forward road of the vehicle through the front lens 7. In this way, a real image of the surface light source is formed on the forward road thereof, and the vehicle headlamp serves as a vehicle headlamp of reflecting mirror (parabola) type.

The heat pipe 3 comes in contact with each of the light source section 1 and the heat radiating member 4 to be thermally connected with those section and member. The heat pipe 3 absorbs the heat emitted by the light source section 1 and transfers the heat to the heat radiating member 4. The heat radiating member 4 transfers the heat transferred from the light source section 1 through the heat pipe 3 to an internal gas.

According to the vehicle headlamp of the third embodiment of the present invention, arranged as discussed above, there are provided functions and effects similar to those of the vehicle headlamp in accordance with the first embodiment, and in addition thereto, the heat pipe 3 can be disposed at a lower position where the optical path of the light output from the light source section 1 is not intercepted as compared with the vehicle headlamp in accordance with the first embodiment. Thus, the vehicle headlamp has a higher degree of freedom in component layout, and deterioration in design of the vehicle headlamp can be prevented.

It is noted that since the heat pipe 3 fixed to the light source section 1 is not flexible; thus, when the position of the light source section 1 is changed in order to adjust the irradiation direction of the vehicle headlamp, it is necessary to move the light source section 1 and simultaneously change the position of the heat pipe 3 connected to the light source section 1. Therefore, if the heat radiating section of the heat pipe 3 is arranged as a portion of the concave mirror 8 moving integral with the light source section 1, the heat pipe 3 including the heat radiating section having no flexibility can be moved integral with the light source section 1 and the concave mirror 8. Thus, non-flexibility of the heat pipe 3 poses no problem, and a structure easy to handle can be built for a light-emitting unit of the vehicle headlamp.

In passing, the portion of the concave mirror 8 can be viewed from the external of the vehicle, and is an important place in design for a vehicle headlamp. For this reason, an unrefined fin 4*a* for the heat radiating member 4 should be reluctantly furnished; however, when the heat radiating member 4 with mirror gloss forming a portion of the concave mirror 8, for instance, is employed, deterioration in design of the vehicle headlamp can be prevented. It should be appreciated that the "concave mirror 8" referred here includes a decorative member imitating a reflecting mirror other than a substantial reflecting mirror for determining the light distribution of the vehicle headlamp.

Fourth Embodiment

The vehicle headlamp in accordance with the fourth embodiment of the present invention employs a concave mirror 8 in place of the convex lens 2 employed in the vehicle headlamp in accordance with the second embodiment.

Figure 6:
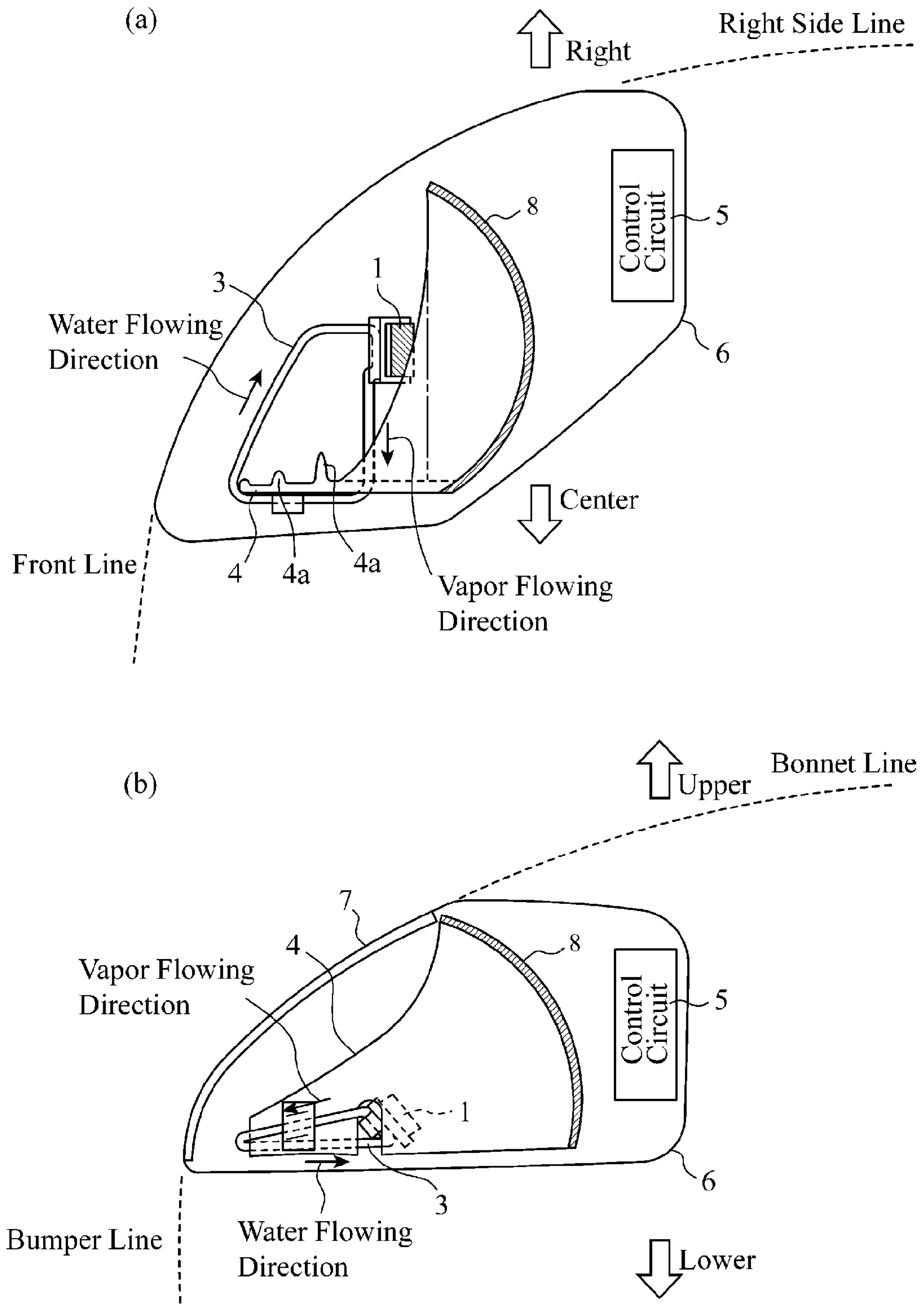
FIG. 6 is a view showing a structure of a vehicle headlamp in accordance with the fourth embodiment of the present invention.

FIG. 6 is a view showing a structure of a vehicle headlamp employing an annular heat pipe in accordance with the fourth embodiment of the present invention, FIG. 6(*a*) is a top plan view of a right vehicle headlamp, and FIG. 6(*b*) is a side view thereof. The vehicle headlamp is composed of a light source section 1, a concave mirror 8, a heat pipe 3, a heat radiating member 4, a control circuit 5, and a headlamp case 6 for housing those components. As shown in FIG. 6(*b*), a front lens 7 is provided at a portion of the front side of the headlamp case 6, to be more specific, at a portion located on the upper side of the heat radiating member 4 in a predetermined area around the optical axis of the light emitted by the light source section 1 and reflected by the concave mirror 8. Hereinafter, explanations will be given with particular emphasis on the portion different from that of the second embodiment.

The light source section 1 is disposed forward of the concave mirror 8 and downward of the front lens 7. The concave mirror 8 reflects the light from the light-emitting surface of the light source section 1, and projects the light onto the surface of the forward road of the vehicle through the front lens 7. Thereby, a real image of the surface light source is formed on the forward road thereof, and the vehicle headlamp functions as a vehicle headlamp of reflecting mirror (parabola) type.

The heat pipe 3 comes in contact with each of the light source section 1 and the heat radiating member 4 to thereby be thermally connected with those section and member. The heat pipe 3 absorbs the heat emitted by the light source section 1 and transfers the heat to the heat radiating member 4. The heat radiating member 4 transfers the heat transferred from the light source section 1 through the heat pipe 3 to an internal gas.

According to the vehicle headlamp of the fourth embodiment of the present invention, arranged as discussed above, there are provided functions and effects similar to those of the vehicle headlamp in accordance with the second embodiment, and in addition thereto, the heat pipe 3 can be disposed at a lower position where the optical path of the light output from the light source section 1 is not intercepted as compared with the vehicle headlamp in accordance with the second embodiment. Thus, the vehicle headlamp has a higher degree of freedom in component layout, and deterioration in design of the vehicle headlamp can be prevented.

Industrial Applicability

As discussed above, the vehicle headlamp according to the present invention is arranged such that a convection current is produced therein by conveying the heat generated by the light source section to the heat radiating member with the heat pipe to radiate the heat therefrom, and thus the light source section can be cooled. Further, the front lens can be efficiently warmed by the convection current, and thus the headlamp can melt snow deposited, e.g., on the front lens. The vehicle headlamp is suitable for use in vehicle headlamps or the like used in cold districts.

The invention claimed is:

1. A vehicle headlamp including:

a light source section for emitting light accompanied by heat;

a heat pipe thermally connected with the light source section, for absorbing and transferring the heat generated by the light source section;

a heat radiating member provided in a position deviated from the optical axis of the light generated by the light source section and closer to a front of the headlamp than the light source section to be thermally connected to the heat pipe, for radiating the heat transferred from the heat pipe to produce a convection current; and a headlamp case housing the light source section, the heat pipe, and the heat radiating member, and having provided on the upper side of the heat radiating member a portion of a front lens for passing the light from the light source section, wherein the heat radiating member has at least one extending fin arranged such that heat transferred to the heat radiating member produces an ascending gas current on a front side of the interior of the headlamp case generating convection such that the ascending current hits the front lens, cools the front lens producing a descending gas current.

2. The vehicle headlamp according to claim 1, wherein the heat radiating member has a vertically extending fin.

3. The vehicle headlamp according to claim 1, wherein the heat pipe includes a rod-shaped heat pipe formed in the shape of a rod.

4. The vehicle headlamp according to claim 3, wherein the heat pipe comprises a heat radiation section thermally connected with the heat radiating member and a heat absorbing section thermally connected with the light source section, and the heat radiating section is positioned higher than the heat absorbing section.

5. The vehicle headlamp according to claim 1, wherein the heat pipe includes an annular heat pipe formed in the shape of a loop with a portion thereof routed downwardly from the light source section.

6. The vehicle headlamp according to claim 5, wherein a cooling liquid inside the annular heat pipe is repeatedly evaporated and liquefied to be naturally circulated.

7. The vehicle headlamp according to claim 5, wherein the annular heat pipe has an inner wall having a flat surface.

8. The vehicle headlamp according to claim 5, wherein the heat pipe comprises a heat radiation section thermally connected with the heat radiating member and a heat absorbing section thermally connected with the light source section;

the heat absorbing section has a vertical difference of altitude; and the heat pipe is formed such that it descends from the upper portion of the heat absorbing section toward the heat radiation section.

9. The vehicle headlamp according to claim 1, wherein the light source section includes a semiconductor light emission element.

10. The vehicle headlamp according to claim 1, wherein the heat radiating member is provided at either a right or left direction with respect to the optical axis.

* * * * *